(12) United States Patent
Ichida

(10) Patent No.: US 7,107,145 B2
(45) Date of Patent: Sep. 12, 2006

(54) NAVIGATION APPARATUS

(75) Inventor: Takashi Ichida, Anjo (JP)

(73) Assignee: Denso Corporation, Kariya (JP)

( * ) Notice: Subject to any disclaimer, the term of this patent is extended or adjusted under 35 U.S.C. 154(b) by 36 days.

(21) Appl. No.: 10/643,921

(22) Filed: Aug. 20, 2003

(65) Prior Publication Data
US 2004/0138806 A1 Jul. 15, 2004

(30) Foreign Application Priority Data
Aug. 22, 2002 (JP) ............................. 2002-241510

(51) Int. Cl.
G01C 21/26 (2006.01)
(52) U.S. Cl. ................... 701/200; 701/208; 701/211
(58) Field of Classification Search ................ 701/200, 701/201, 207, 209, 210, 211, 213, 212, 217; 340/988, 990, 995.1–995.28
See application file for complete search history.

(56) References Cited

U.S. PATENT DOCUMENTS 5,526,476 A   6/1996  Motokado et al.
6,184,823 B1 * 2/2001  Smith et al. ............ 342/357.13
6,192,314 B1 * 2/2001  Khavakh et al. ............ 701/209
6,262,741 B1 * 7/2001  Davies ........................ 345/423
6,278,383 B1 * 8/2001  Endo et al. ............ 340/995.14
6,333,702 B1 * 12/2001 Hiyokawa et al. ..... 340/995.21
6,356,835 B1 * 3/2002  Hayashi et al. .............. 701/208
6,587,787 B1 * 7/2003  Yokota ........................ 701/212

FOREIGN PATENT DOCUMENTS

JP    A-4-324571    11/1992
JP    A-6-266340     9/1994
JP    A-2000-46570   2/2000
JP    A-2002-98542   4/2002

* cited by examiner

Primary Examiner—Richard M. Camby
(74) Attorney, Agent, or Firm—Posz Law Group, PLC

(57) ABSTRACT

The present invention provides a navigation apparatus capable of distinguishing characters displayed in a display screen. Names of objects to be displayed on a road map are respectively indicated with the characters of the font types corresponding to categories of the objects such as an administrative district, a facility, a natural feature and so on. Accordingly, a user of the navigation apparatus can readily distinguish and recognize the characters showing the various kinds of the objects.

6 Claims, 4 Drawing Sheets

NAVIGATION APPARATUS

CROSS REFERENCE TO RELATED APPLICATION

This application is related to and incorporates herein by reference Japanese Patent Applications No. 2002-241510 filed on Aug. 22, 2002.

FIELD OF THE INVENTION

This invention relates to a navigation apparatus in which characters displayed in a display screen can be readily recognized.

BACKGROUND OF THE INVENTION

A conventional navigation apparatus displays on a road map characters showing names of various kinds of facilities, natural features, roads, and so on, in addition to names of administrative districts such as prefectures, cities, towns, villages. The characters are stored in advance, as image data having different font sizes or outline font data. The characters are displayed by using the image data or outline font data.

Here, since the image data or outline font data shows characters of only one font type, the conventional navigation apparatus changes the colors or sizes of the characters in purposes of highlighting and differentiating the characters in accordance with categories of the objects shown thereby.

However, in a case where the colors of the characters are changed, since the roads are indicated with the different colors depending on the road categories (toll road, national highway, city road, or the like), if the color of the character assimilates to one of the road colors, it results in inferior character recognition.

As for the size of the character, it is difficult to change the sizes of the characters on an operating page, such as a menu page of the navigation apparatus, for setting or performing various kinds of functions of the navigation apparatus.

SUMMARY OF THE INVENTION

An object of the present invention is to provide a navigation apparatus in which characters displayed in a display screen can be readily distinguished and recognized.

According to a first aspect of the present invention, a navigation apparatus comprises display control means for obtaining road map data and, on the basis of the obtained road map data, displaying a road map in a display screen, and character data storing means for storing character data including plural types of fonts with respect to each character in order to display the characters on the road map in the display screen. The display control means reads character data of the font type corresponding to a category of an object to be indicated by the characters displayed on the road map out of the character data storing means and displays the read character data on the road map.

In this way, the names of the objects to be displayed on the road map are respectively indicated with the characters of the font types corresponding to the categories of the objects such as an administrative district, a facility, a natural feature and so on. Accordingly, a user of the navigation apparatus can readily distinguish and recognize the characters showing the various kinds of the objects.

According to a second aspect of the present invention, a navigation apparatus displays in a display screen characters showing various kinds of operating items for operating the navigation apparatus. The navigation apparatus comprises character data storing means for storing character data including plural types of fonts with respect to each character to be displayed, and display control means for differentiating a font type for the characters indicating an operating item(s) to be highlighted from a font type for the characters showing the other operating items, when the various kinds of the operating items are displayed by using the plural types of fonts stored in the character data storing means.

In this way, the user can readily distinguish the operating item(s) to be highlighted, by differentiating the font types for the characters.

BRIEF DESCRIPTION OF THE DRAWINGS

The other objects and features of the present invention will become more readily apparent from the following detailed description taken in conjunction with the accompanying drawings in which.

DETAILED DESCRIPTION OF THE PREFERRED EMBODIMENT

A navigation apparatus according to an embodiment of the present invention will be described with reference to the drawings.

Figure 1:
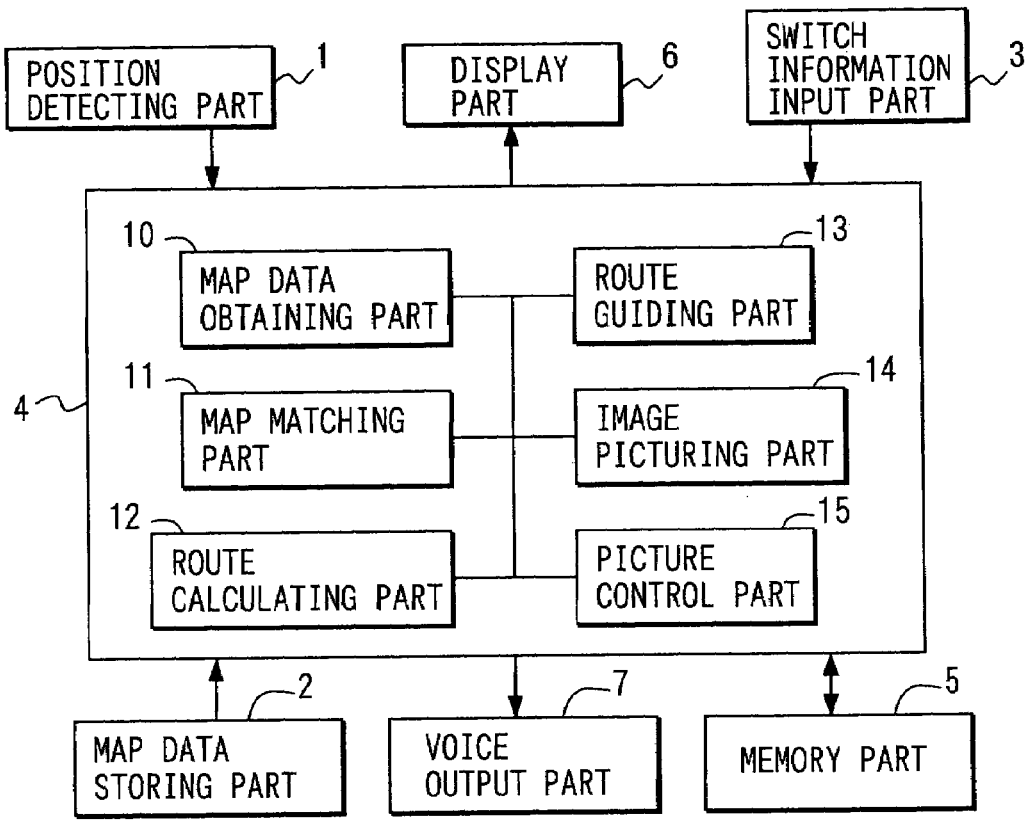
FIG. 1 is a block diagram illustrating a schematic structure of a navigation apparatus according to an embodiment of the present invention.

FIG. 1 is a block diagram illustrating a schematic structure of the navigation apparatus according to the embodiment of the present invention. As shown in FIG. 1, the navigation apparatus of this embodiment has a position detecting part 1, a map data storing part 2, a switch information input part 3, a control part 4, a memory part 5, a display part 6 and a voice output part 7.

The position detecting part 1 includes a geomagnetic sensor, a gyro sensor, a vehicle speed sensor and a GPS sensor for calculating a position of a vehicle based on radio signals from satellites, all of which are well known. These sensors have errors, the properties of which are different form each other. Therefore, they are used while complementing each other. It is to be noted that the position detecting part 1 may not include all of the sensors described above, depending on the accuracy of each sensor.

The map data storing part 2 is for inputting map data such as a road map, identification data and so on into the control part 4. The map data storing part 2 has a storing medium for storing the map data. It is general to use a CD-ROM or DVD-ROM as the storing medium because of data amount to be stored, but a medium such as a memory card or hard disc can be used. Further, the map data storing part 2 may have a communication device communicating with an external server for example, and acquire map data stored in the external server through communication.

The switch information input part 3 has mechanical switches provided at the periphery of the display part 6, or touch switches incorporated in the display part 6 to carry out input operations. For example, the navigation apparatus has a route guidance function. When a destination is given by the switch information input part 3, the control part 4 selects an optimum traveling route to the destination from a departing point determined based on a current position and gives route guidance so that the user can travel on the selected traveling route.

The display part 6 is formed by a liquid crystal display for example. In the screen of the display part 6, a road map around the current position of the vehicle is displayed along with a vehicle mark showing the vehicle current position. In addition, a selection picture for selecting the destination, a setting picture for setting "ON" and "OFF" of various kinds of functions in the navigation apparatus and so on are displayed in the screen.

The memory part 5 stores character data used in displaying the road map, the selection picture and the setting picture in the display part 6. The character data includes data having plural types of fonts such as a KAISHO-TAI (square style of Chinese character), a MINCHO-TAI (style that vertical lines are bolder than horizontal lines), a square GOTHIC-TAI, a round GOTHIC-TAI and so on, with respect to each character. As a result, it is possible to change the font type for the characters displayed in the screen.

The voice output part 7 has a speaker, and outputs voices for the route guidance and for explaining how to operate the navigation apparatus.

The control part 4 has an ordinary computer provided with a CPU (central processing unit), a ROM (read only memory), a RAM (random access memory), an Input-Output Circuit, and a bus line connecting therebetween, all of which are well known. Written in the ROM is a program carried out by the on-vehicle navigation apparatus, and the CPU performs a predetermined operation processing according to that program. It is to be noted that FIG. 1 shows main functions performed by the control part 4 as a block diagram. That is, the control part 4 has a map data obtaining part 10, a map matching part 11, a route calculating part 12, a route guiding part 13, an image picturing part 14 and a picture control part 15.

The map data obtaining part 10 normally obtains the map data including the road map around the current position detected by the position detecting part 1 from the map data storing part 2 and gives it to the picture control part 15. The picture control part 15 instructs the image picturing part 14 to display in the display part 6 the road map around the current position of the vehicle along with the vehicle mark showing the vehicle current position. A traveling locus of the vehicle is stored in the map matching part 11 while the vehicle is traveling. The map matching part 11 collates the traveling locus with the shape of the road. If it is determined on the basis of this collation that the vehicle position displayed in the display part 6 deviates from an actual vehicle position, the map matching part gives a correct vehicle position to the picture control part 15. The picture control part 15 instructs the image picturing part 14 to correct the vehicle position displayed in the display part 6.

When a destination is inputted by the switch information input part 3, the route calculating part 12 calculates an optimum route from the current position to the destination. At this time, the map data obtaining part 10 obtains map data including road maps covering routes from the current position to the destination, and the route calculating part 12 calculates the optimum route by applying a well-known method such as a Dijkstra method to that map data. The calculated optimum route is given to the route guiding part 13. The route guiding part 13 instructs the picture control part 15 to display roads corresponding to the optimum route with a specific color on the road map displayed in the display part 6. Moreover, the route guiding part 13 computes guidance points such as intersections at which the vehicle turns to the right or left, and outputs voice signals to the voice output part 7 so as to inform upon such guidance points with voice. In addition, the information relating to the guidance points is given to the picture control part 15, and the picture control part 15 instructs the image picturing part 14 to display an enlarged map around an intersection or a schematic map of a highway in the display part 6.

Next, a character display control processing which is a characterized part in the present embodiment will be explained in details.

Figure 3:
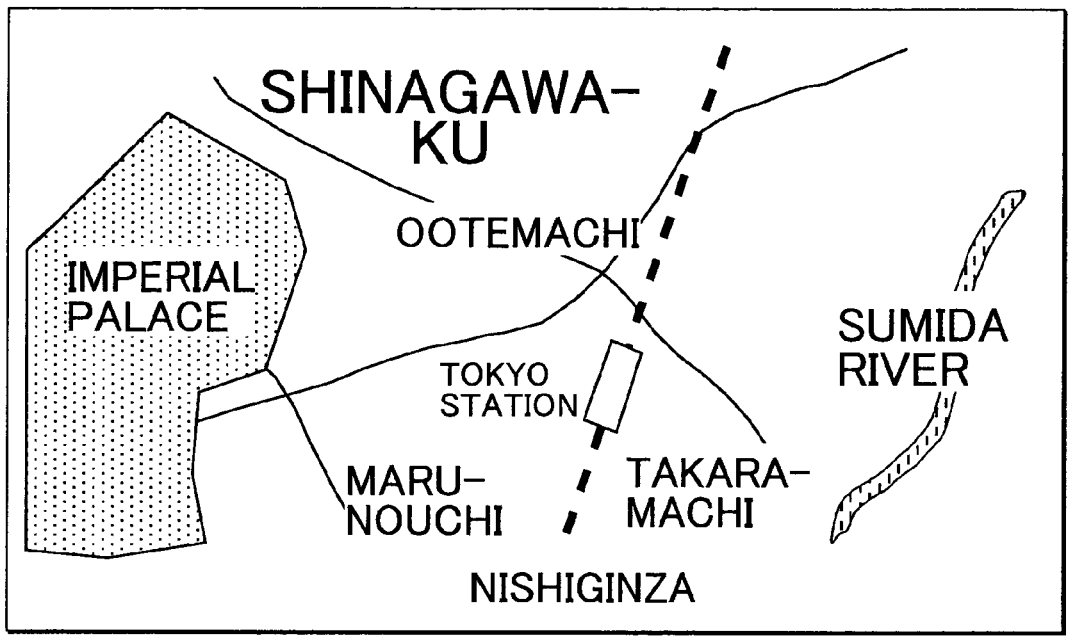
FIG. 3 is an illustration for illustrating a display example of the characters on the road map according to a related art.

(1) A case where characters showing names of administrative districts, facilities, and so on are displayed on a road map When the characters representing the names of the administrative districts (names relating to addresses), facilities and so on are displayed on the road map, as shown in FIG. 3, the conventional navigation apparatus adequately changes the colors and sizes of the characters shown by one type of a font. However, when the colors of the characters are changed, if any one of the characters has the specific color assimilating to the line color showing the road or the facility and is displayed to cross thereover, it results in inferior character recognition. In addition, even though the sizes of the characters are changed, since the font type therefor is common, it is difficult for the user to distinguish the category of the object that the characters represent at a glance.

Figure 2:
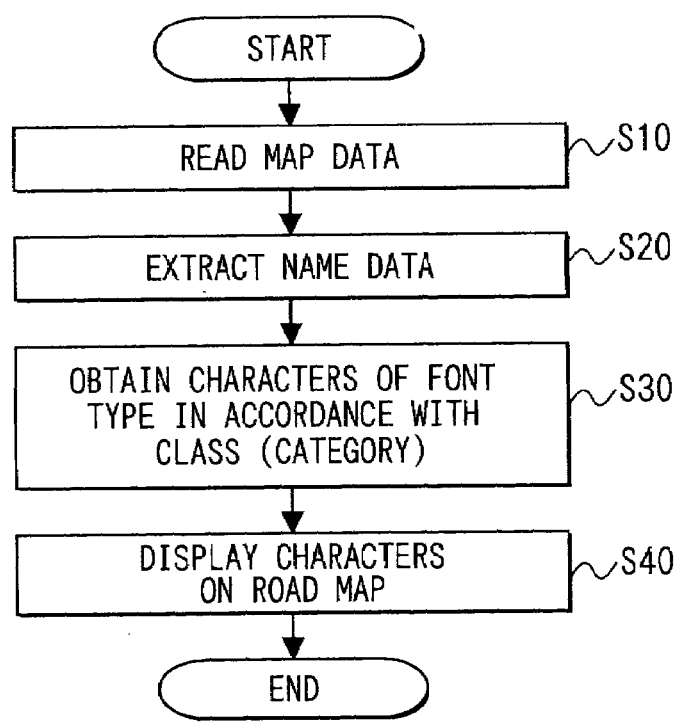
FIG. 2 is a flowchart for illustrating a display control process for characters displayed on a road map.
Figure 4:
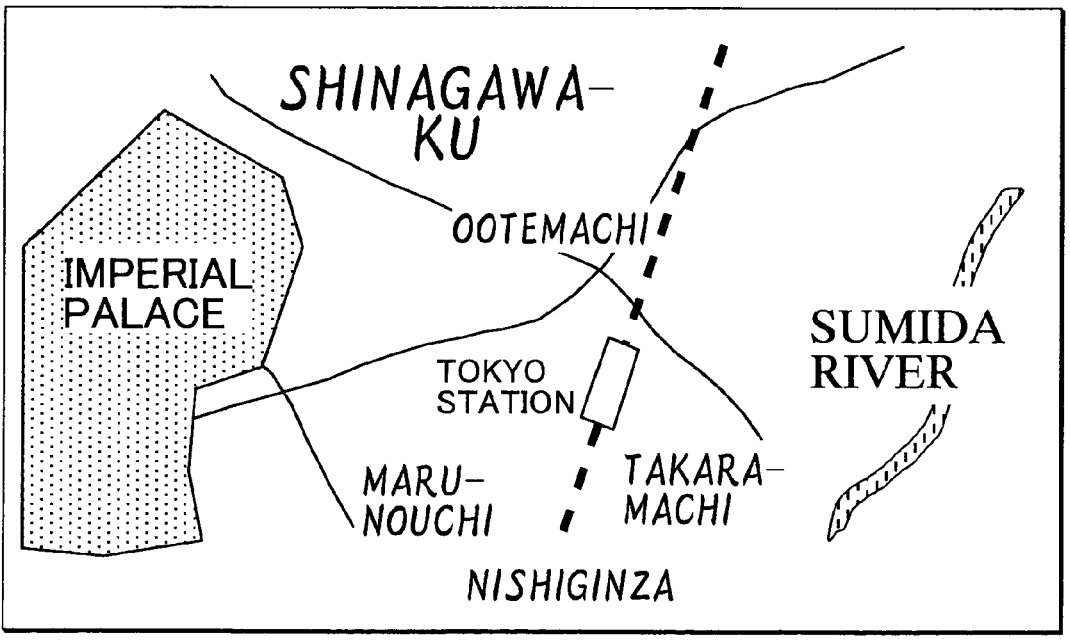
FIG. 4 is an illustration for illustrating a display example of the characters on the road map according to the embodiment.

Therefore, in the present embodiment, as shown in FIG. 4, font types for the characters are changed in accordance with categories of the objects such as an administrative district, a facility, a natural feature and so on. In the display example in FIG. 4, the names relating to the addresses are displayed with the characters of the font type "KAISHO-TAI", the names of the natural features are displayed with the characters of the font type "MINCHO-TAI", and the names of the facilities are displayed with characters of the font type "GOTHIC-TAI". As a result, the user can realize the category of the object represented by each name at a glance and readily recognize the characters shown in the display part 6. In the followings, the processing for changing the font types in accordance with the categories of the objects will be described in reference to the flowchart in FIG. 2.

At step S10, the map data for displaying a road map in the display part 6 is read out of the map data storing part 2. The map data includes data relating to names to be displayed on the road map, as the identification data. The data relating to the names comprises coordinate data for indicating a position of each name (characters) to be displayed, class data for indicating a category of the object represented by the name, and code data for indicating the characters forming the name.

At step S20, the data relating to the names (name data) is extracted from the map data. At step S30, the font type for the characters indicating each of the names is determined in reference to a relation between the class data and the font types. On the basis of the code data indicating characters composing the name, the characters of the determined font type are read out of the memory 5. It is to be noted that the relation between the class data and the font types is predetermined and stored in the memory 5. Further, the relation may be changed at will by a user. Due to this, the names of the facilities, administrative districts, natural features and so on can be displayed on the road map with the characters of the font types in accordance with a user's preference.

At step S40, the characters read in the step S30 are respectively displayed at positions indicated by the respective coordinate data, on the road map included in the map data read in the step S10. It is to be noted that the processing for displaying the characters on the road map is carried out by the picture control part 15 of the control part 4 shown in FIG. 1.

According to the processing as described above, the names can be displayed on the road map while changing the font types for the characters indicating the names in accordance with the categories of the objects such as an administrative district, a facility, a natural feature and so on.

(2) A case where a list including plural names is displayed

Figure 5:
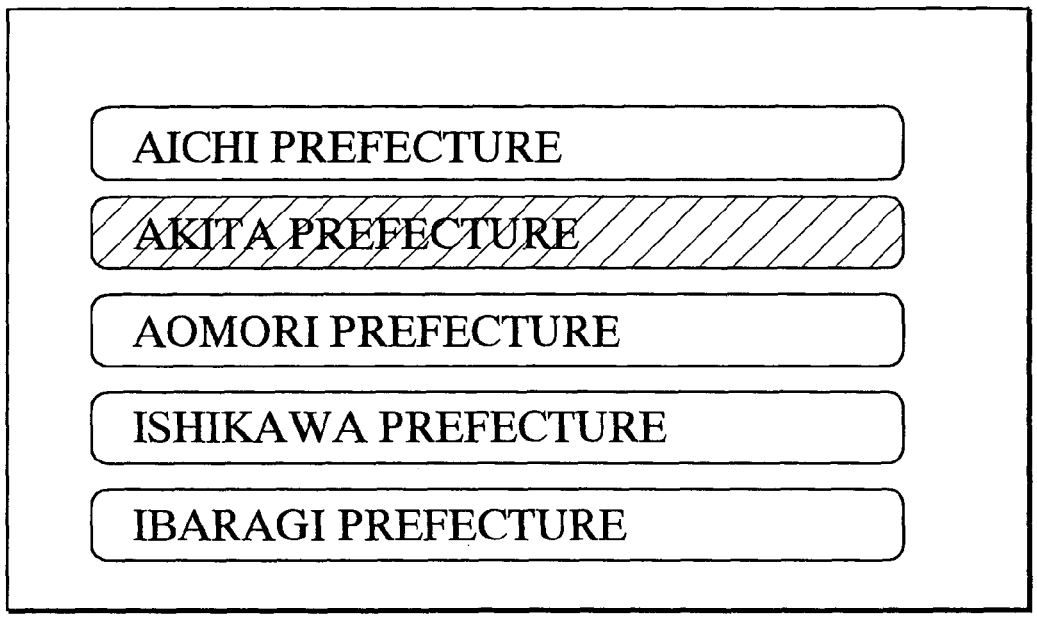
FIG. 5 is an illustration for illustrating a display example of a list including plural items which can be selected according to a related art.

In the conventional navigation apparatus, when a destination is set for example from a genre like a restaurant or an amusement park, the name of the prefecture in which a facility to be set as the destination exists is selected from the list of the prefecture's names, or the name of the facility to be set as the destination is selected from the list of the facility's names. In those cases, as shown in FIG. 5, the conventional navigation apparatus differentiates an item with which a cursor matches from the other items by coloring an entire area within a frame surrounding the name (prefecture's name) of that item with a first color different from a second color of the insides of the frames surrounding the other names. When a determination switch is pushed on, the item (name) with which the cursor matches is selected.

Figure 6:
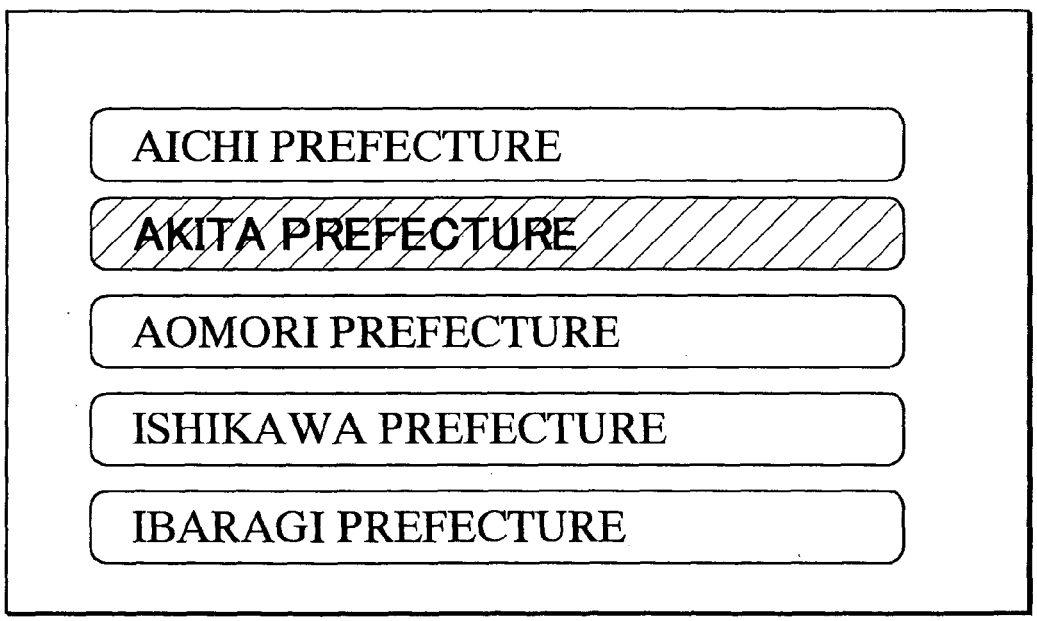
FIG. 6 is an illustration for illustrating a display example of a list including plural items which can be selected according to the embodiment.

The present embodiment differentiates the font type for the characters indicating the names in the item with which a cursor matches from the font type for the characters indicating the other names. As a result, the user can recognize the characters indicating the names with which the cursor matches much easier. In the display example in FIG. 6, in addition to that an entire area within a frame surrounding the name (prefecture's name), with which the cursor matches, are colored with a first color different from a second color of the insides of the frames surrounding the other names, the font type for the characters indicating that name is set to the and the font type for the characters indicating the other names is set to the "MINCHO-TAI". Because the font type "GOTHIC-TAI" is bolder than the font type "MINCHO-TAI", the characters in the item with which the cursor matches are highlighted comparing to the other characters.

In order to carry out such display control for the font types, when the cursor moves, character data of the "GOTHIC-TAI" with respect to the characters in a cursor-matching item is read out of the memory 5, and character data of the "MINCHO-TAI" with respect to the other characters is also read out of the memory 5. The change of the font types as described above is carried out by the picture control part 15.

Figure 7:
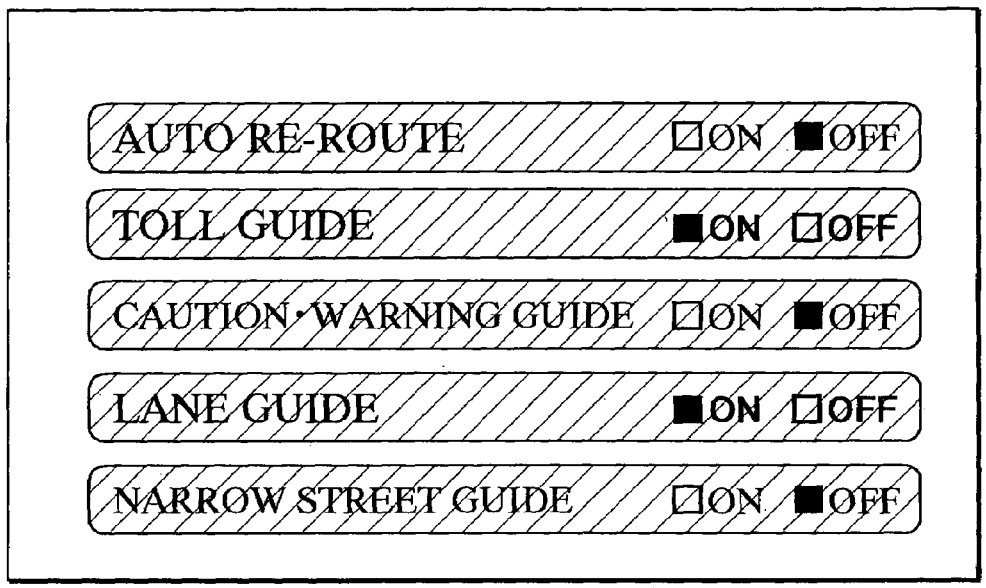
FIG. 7 is an illustration for illustrating a display example of a picture for setting "ON" and "OFF" of various kinds of functions in the navigation apparatus according to a related art.

(3) A case where a picture for setting "ON" and "OFF" of various kinds of functions of the navigation apparatus is displayed The conventional navigation apparatus has functions that the user can determine at will whether or not the functions are carried out, like an auto re-route function in which a new guide route is automatically searched when the vehicle deviates off the guide route to the destination. An example of a setting picture for setting an on-state ("ON") and off-state ("OFF") with respect to each of such functions is shown in FIG. 7. In the setting picture in FIG. 7, display boxes of "ON" are colored with respect to the functions in which the display box of "ON" is checked, and display boxes of "OFF" are colored with respect to the functions in which the display box of "OFF" is checked.

Figure 8:
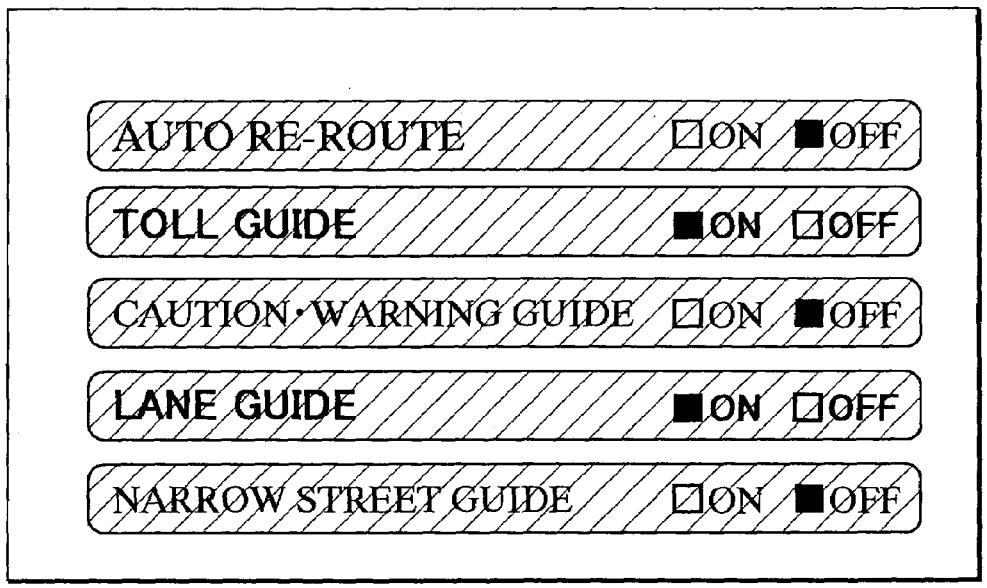
FIG. 8 is an illustration for illustrating a display example of a picture for setting "ON" and "OFF" of various kinds of functions in the navigation apparatus according to the embodiment.

The present embodiment, on the other hand, differentiates the font type for the characters in the item of which the "ON" box is checked from the font type for the characters in the item of which the "OFF" box is checked. As a result, the user can easily recognize the functions set to "ON". In the display example in FIG. 8, the characters indicating the names of the functions set to "ON" are displayed with the font type of the "GOTHIC-TAI", and the characters indicating the names of the functions set to "OFF" are displayed with the font type of the "MINCHO-TAI". As a result, since the font type "GOTHIC-TAI" is bolder than the font type "MINCHO-TAI", the characters indicating the names of the functions set to "ON" are highlighted and the user can easily distinguish the functions set to "ON" from the functions set to "OFF".

In order to carry out such display control for the font types, when either "ON" or "OFF" in each of the items is checked for example by using the touch switches, character data of the "GOTHIC-TAI" with respect to the characters indicating the name of the function set to "ON" is read out of the memory 5, and character data of the "MINCHO-TAI" with respect to the characters indicating the name of the function set to "OFF" is also read out of the memory 5.

It is to be noted that font type used for highlighting may be determined in advance or changed at will by the user. If the user change the font type, it is possible to display the setting picture with the characters in accordance with an individual user's preference.

In the above-described embodiment, four types of fonts ("KAISHO-TAI", "MINCHO-TAI", round, and square "GOTHIC-TAI") are used. However, the font types are not limited to the above-described examples, and the any types of fonts can be used.

What is claimed is:

1. A navigation apparatus comprising:
   a display part having a display screen;
   character data storing means for storing character data including plural types of fonts with respect to each character to be displayed; and
   display control means for differentiating a font type for the characters indicating an operating item to be highlighted from a font type for the characters indicating remaining operating items, when various kinds of operating items for operating the navigation apparatus are displayed in the display screen by using-the plural types of fonts stored in the character data storing means,
   wherein the operating items are for setting on-state and off-state of functions of the navigation apparatus, and the display control means highlights the characters in the operating item corresponding to the function set to the on-state.

2. The navigation apparatus according to claim 1, wherein the display control means uses a font type having bolder lines for the characters in the operating item corresponding to the function set to the on-state.

3. The navigation apparatus according to claim 1, wherein the font type used for highlighting the characters is capable of being determined by a user.

4. A navigation apparatus comprising:
a display part having a display screen;
character data storing means for storing character data including plural types of fonts with respect to each character to be displayed; and
display control means for differentiating a font type for the characters indicating an operating items, when be highlighted from a font type for the characters indicating remaining operating items, when various kinds of operating items for operating the navigation apparatus are displayed in the display screen by using the plural types of fonts stored in the character data storing means,
wherein the operating items are for displaying names of objects to be selected, and the display control means highlights the characters representing an object name in the operating item with which a cursor matches among the operating items.

5. The navigation apparatus according to claim 4, wherein the display control means uses a font type having bolder lines for the characters in the operating item with which the cursor matches.

6. The navigation apparatus according to claim 4, wherein the font type used for highlighting the characters is capable of being determined by a user.

* * * * *